3,290,354
METHOD OF PREPARING ACRYLONITRILE
Jamal S. Eden, Akron, Ohio, assignor to The B. F. Goodrich Company, New York, N.Y., a corporation of New York
No Drawing. Filed Jan. 20, 1964, Ser. No. 338,586
8 Claims. (Cl. 260—465.3)

This invention relates to a method of preparing acrylonitrile by the catalytic ammonoxidation of propylene by passing a mixture of propylene, ammonia, an oxygen containing gas, with or without water vapor, through a bed of a catalyst at a temperature of from about 400 to about 500° C., wherein the catalyst is a mixture of a copper phosphate, particularly copper pyrophosphate, a tellurium compound that is convertible to $TeO_2$ under the conditions for forming the catalyst and a rhenium compound which can be converted to $HReO_4$ or $Re_2O_7$ under conditions of preparation for the catalyst. The ratio of copper pyrophosphate to tellurium to rhenium can be 100 for the copper pyrophosphate, 10–30 for Te calculated as $TeO_2$ and 1–10 for rhenium calculated as $HReO_4$. This can also be written empirically as $$CU_{200}P_{200}Te_{10-30}Re_{1-10}O_{724-800};$$

in which P is present as a phosphate, and preferably a pyrophosphate.

It is known that propylene can be converted to acrylonitrile by the ammoxidation with certain copper containing catalysts, particularly copper oxide, but the conversion of propylene and yield of acrylonitrile are usually quite low, so that efficiency is also low.

With the catalysts of the present invention it is possible to get propylene conversions of 70–90% with yields of acrylonitrile of from about 58% to about 65.4% and efficiencies of from 46% to 53.7%.

REACTANTS

The only essential reactants are propylene, ammonia and an oxygen containing gas, which can be pure oxygen or oxygen mixed with an inert gas. Thus, air, or oxygen enriched air, can be used, as can oxygen which is blended with other inert gases, such as xenon, neon, krypton or helium. The preferred oxygen containing gas is air.

The propylene need not be pure. It can contain appreciable amounts, up to about 20%, of contaminants such as the higher or lower alkanes, without interference with the desired reaction, except for the consumption of some oxygen due to oxidation of a portion of the contaminants.

The ammonia can be fed as dry ammonia or as ammonia containing water.

Water vapor is not an essential ingredient in the reaction, but it does improve yields of acrylonitrile and conversion of propylene under the reaction conditions and it may also aid in controlling reaction temperature by absorbing heat.

The ratios of reactants can vary between 1 to 3 mols of oxygen, 1 to 2 mols of ammonia, and 0 to 7 mols of water vapor per mol of propylene.

THE CATALYST

The catalyst is a mixture of a copper phosphate, which can be $Cu_3(PO_4)_2$, $Cu_2P_2O_7$ or a copper polyphosphate, such as $Cu_5(P_3O_{10})_2$ with tellurium oxide and a rhenium oxide, which can be perrhenic acid or $Re_2O_7$. The molar ratio of ingredients can be 10–30 for $TeO_2$ and 1–10 for $HReO_4$ or a corresponding amount of $Re_2O_7$ for each 100 mols of copper phosphate.

CATALYST PREPARATION

The catalyst can be prepared by several procedures and it can be supported or unsupported.

For fixed bed reactions the catalyst of 10–18 U.S. sieve size is preferred and for fluid bed reactions a U.S. sieve size of 80–325 mesh is preferred.

METHOD I 34.1 g. $CuCl_2 \cdot 2H_2O$ were dissolved in water.

1.6 g. $TeO_2$ were added to the $CuCl_2$ solution.

1 g. of $HReO_4$ dissolved in water was added to the $CuCl_2 \cdot TeO_2$ mixture.

23.3 g. of 85% $H_3PO_4$ were added to the above ingredients.

Then 247 g. of a microspheroidal colloidal silica dispersion in water, containing about 30% by weight $SiO_2$, were added to the remaining ingredients. After thorough stirring, the mixture was evaporated to dryness on a steam bath and baked at 400° C. for about 16 hours. The catalyst was then cooled, crushed and screened to the desired sizes.

The method of drying the catalyst is not critical. This step can be performed equally well by spray drying or any other form of removal of water by heat.

METHOD II

In this procedure the $TeO_2$ was dissolved in concentrated HCl to form a homogeneous mixture prior to the addition of $H_3PO_4$. Otherwise the steps are the same as Method I.

METHOD III

Dry, particulate $Cu_2P_2O_7$, $TeO_2$ and $Re_2O_7$ are blended in a ball mill to the desired fineness and screened.

METHOD IV

A paste of $Cu_2P_2O_7$ or other copper phosphate is prepared, dry $TeO_2$ and $HReO_4$ or $Re_2O_7$ are added thereto in the required amounts. The support can be blended with the paste, then dried and baked.

The supports are preferably finely divided refractory materials of low porosity. Suitable supports include silicic materials, such as colloidal silica, kieselguhr, clay, diatomaceous earth, alumina, aluminum phosphate, zirconium oxide and silicon carbide.

The preferred supports are colloidal silica and diatomaceous earth.

REACTION CONDITIONS

The reaction is carried out at a temperature of from about 400 to about 500° C. and preferably between about 420 and 480° C. The contact time can range from about 2 to about 70 seconds, but a cold contact time of 20–50 seconds is preferred. The hot contact time is usually about 40% of the cold contact time given in the examples.

The reaction is preferably carried out at autogenous pressure but it can range from atmospheric to about 100 p.s.i.

Example I

The catalyst had a molar ratio of 50 $Cu_2P_2O_7$, 10 $TeO_2$, 1 $HReO_4$ on 620 mols of colloidal silica. 40 ml. of the catalyst prepared by Method I were placed in a high silica (Vycor) tube reactor 6 in. long and 22 mm. O.D. The reactor was electrically heated by three coils, one of which extended along the entire length of the reactor and each of the other two coils extended about 50% of the reactor length. The reactor was preheated to about 280–300° C. and then steam at a temperature of about 250° C. was admitted through one opening in the reactor. The requisite amount of propylene was blended with the steam just prior to entry into the reactor and oxygen, supplied as air, and ammonia, in the required amount, were fed into the reactor through separate entry ports.

The reactor temperature was then raised to the temperatures indicated in the table of data below. The contact time is cold contact time.

The effluent gases were run through a water cooled condenser. The uncondensed gases were passed directly through a vapor phase chromatograph (Perkin-Elmer 154D) and analyzed. The condensed liquids were weighed and then vaporized and passed through a vapor phase chromatograph for analysis.

The data of these runs are given below:

| $O_2/C_3H_6$ | $H_2O/C_3H_6$ | $NH_3/C_3H_6$ | Contact Time, Sec. | Temp., °C. | Mol Percent Conversion | Mol Percent Yield Acrylonitrile | Mol Percent Efficiency |
|---|---|---|---|---|---|---|---|
| 2.1 | 4.5 | 1.1 | 41 | 435 | 81.1 | 61.2 | 50.1 |
| 2.2 | 4.5 | 1.1 | 30 | 440 | 70.6 | 65.4 | 46.2 |
| 2.2 | 4.5 | 1.1 | 30 | 455 | 78.5 | 61.6 | 48.4 |

*Example II*

The reactor, mode of operation and amount of catalyst were the same as described in Example I. The catalyst had a ratio of 50 $Cu_2P_2O_7$, 15 $TeO_2$, and 1 $HReO_4$ and 620 mols of colloidal silica.

Data obtained in the runs with this catalyst are tabulated below:

| $O_2/C_3H_6$ | $H_2O/C_3H_6$ | $NH_3/C_3H_6$ | Contact Time, Sec. | Temp., °C. | Mol Percent Conversion | Mol Percent Yield Acrylonitrile | Mol Percent Efficiency |
|---|---|---|---|---|---|---|---|
| 2.1 | 4.6 | 1.1 | 36 | 440 | 78.4 | 65.2 | 51.1 |
| 2.1 | 4.6 | 1.2 | 36 | 440 | 78.2 | 68.7 | 53.7 |

*Example III*

The reactor mode of operation and amount of catalyst were the same as described in Example I. The catalyst had a molar ratio of 100 $Cu_2P_2O_7$, 20 $TeO_2$ and 1 $HReO_4$ on 1240 mols of $SiO_2$. The feed ratio per mol of propylene was 2.1 for oxygen supplied as air, 4.0 water vapor, and 1.25 for $NH_3$. The cold contact time was 33 seconds and the temperature was 450° C. Under these conditions 73.8% of the propylene was converted with a 65.1% yield of acrylonitrile, for an efficiency of 48.0%.

Other catalysts containing copper phosphates, tellurium and rhenium in the proportions defined, give comparable results when reactant ratios are in the ranges indicated and the reaction conditions are met.

In the fluidized bed systems, conversion of propylene is usually slightly lower, but the yield of acrylonitrile is approximately the same as for fixed bed systems.

I claim:

1. A method of preparing acrylonitrile comprising passing a mixture in a molar ratio per mol of propylene of 1 to 2 mols ammonia, up to 7 mols of water vapor and 1 to 3 mols of oxygen, through a bed of catalyst consisting essentially of copper phosphate, Te calculated as $TeO_2$ and Re calculated as $HReO_4$, in a molar ratio of 100 mols of copper phosphate, 10–30 mols of Te and 1–10 mols of Re at a temperature of from about 400 to about 500° C. with a contact time of from about 2 to about 70 seconds.

2. The method of claim 1 in which the catalyst has a ratio of 100 $Cu_2P_2O_7$, 10–30 $TeO_2$ and 1–2 $HReO_4$.

3. The method of claim 1 in which the temperature is 420–480° C.

4. The method of claim 1 in which the ratio of reactants per mol of propylene is 1.1 to 1.5 mols of $NH_3$, 4 to 5 mols of water vapor and 2 to 2.5 mols of oxygen per mol of propylene.

5. A method of preparing acrylonitrile comprising passing a mixture in a molar ratio per mol of propylene of 1 to 1.25 mols of $NH_3$, 4 to 5 mols of water vapor and sufficient air to provide 2 to 2.2 mols of oxygen per mol of propylene, through a bed of a catalyst consisting essentially of $Cu_2P_2O_7$, $TeO_2$ and $HReO_4$, in a molar ratio of 100 mols of $Cu_2P_2O_7$, 15–20 mols of $TeO_2$ and 1–2 mols of $HReO_4$ at a temperature of from about 420 to about 455° C. with a contact time of from about 30 to about 41 seconds.

6. The method of claim 1 in which the catalyst is impregnated on an inert refractory support.

7. The method of claim 6 in which the support is colloidal silica.

8. The method of claim 6 in which the support is diatomaceous earth.

No references cited.

CHARLES B. PARKER, *Primary Examiner.*

JOSEPH P. BRUST, *Assistant Examiner.*